Dec. 28, 1954  C. D. KNOWLTON  2,698,073
CLUTCH
Filed Oct. 5, 1951  7 Sheets-Sheet 1

Inventor
Cutler D. Knowlton
by Roberts, Cushman & Grover
attys.

Dec. 28, 1954   C. D. KNOWLTON   2,698,073
CLUTCH
Filed Oct. 5, 1951   7 Sheets-Sheet 2

Inventor
Cutler D. Knowlton
by Roberts, Cushman & Grover
Att'ys.

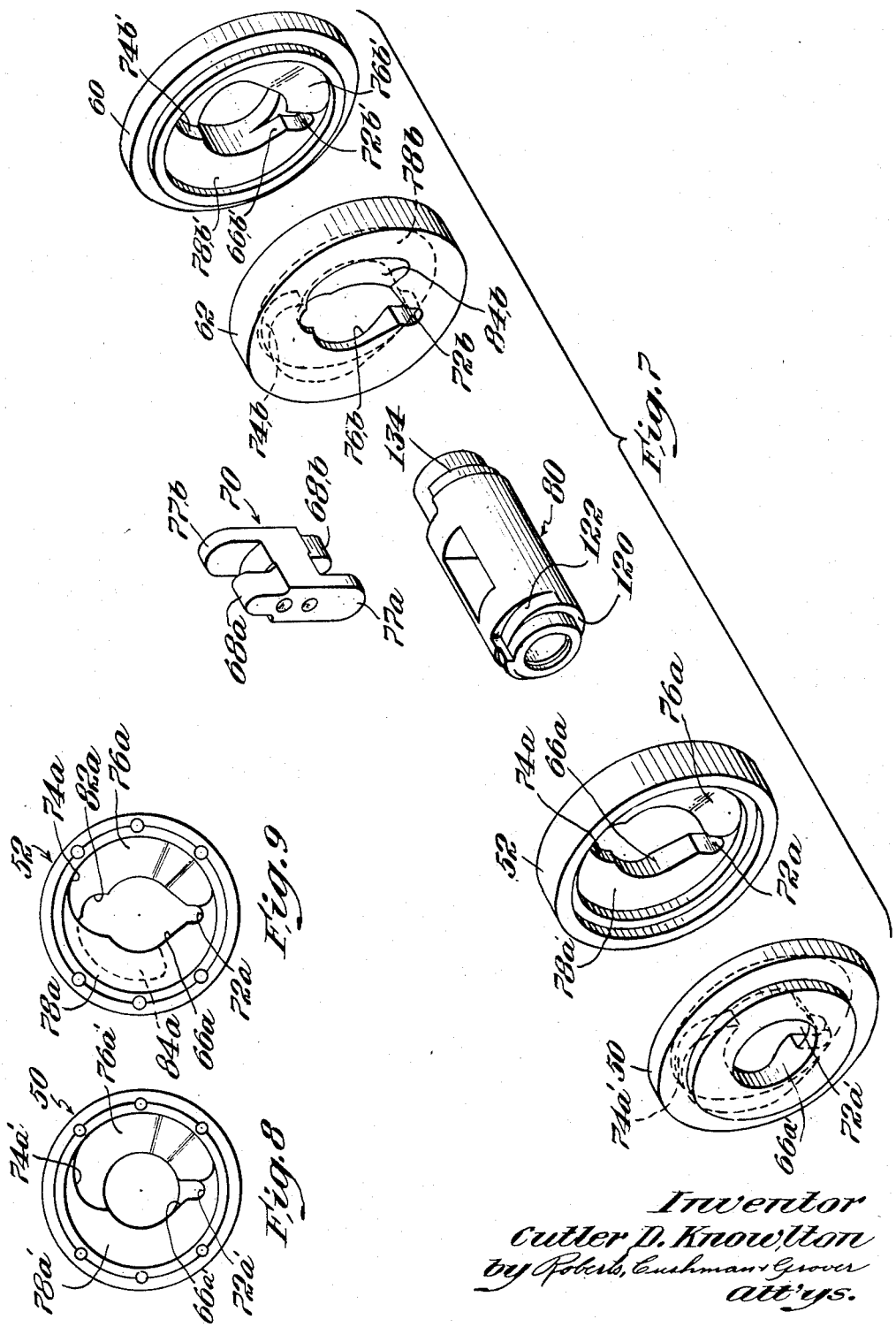

Dec. 28, 1954 C. D. KNOWLTON 2,698,073
CLUTCH
Filed Oct. 5, 1951 7 Sheets-Sheet 4
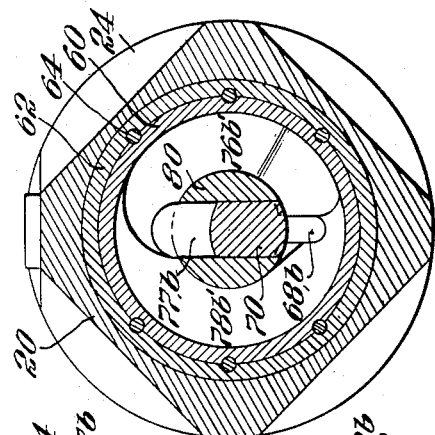
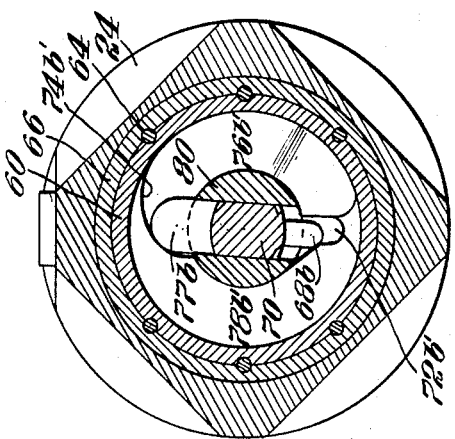
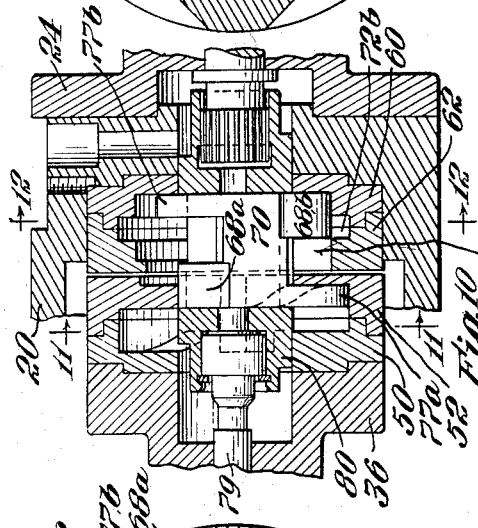
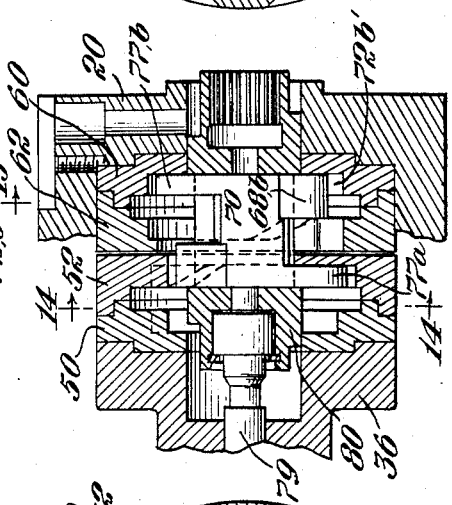
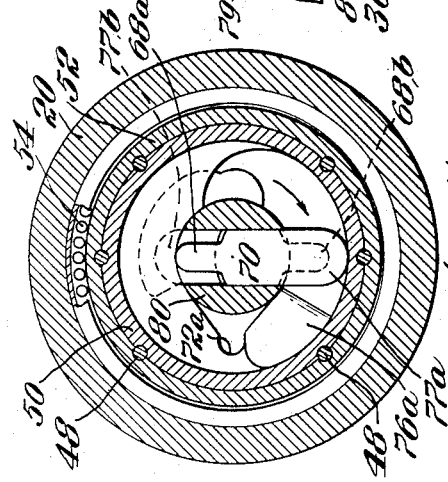
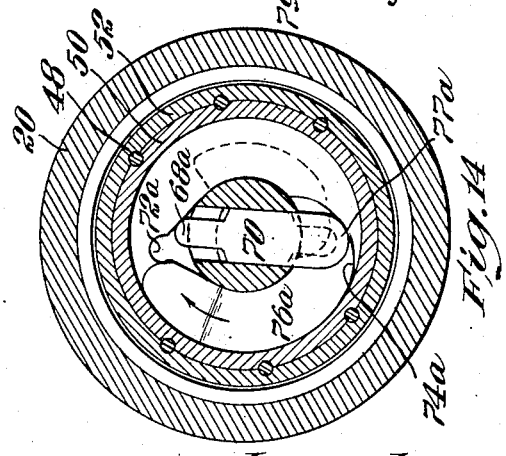
Inventor
Cutler D. Knowlton
by Roberts, Cushman & Grover
att'ys.

Dec. 28, 1954     C. D. KNOWLTON     2,698,073
CLUTCH
Filed Oct. 5, 1951     7 Sheets-Sheet 5
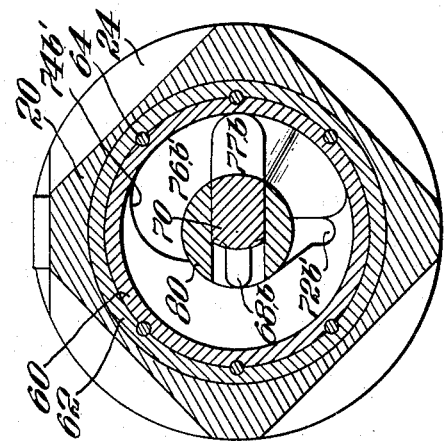
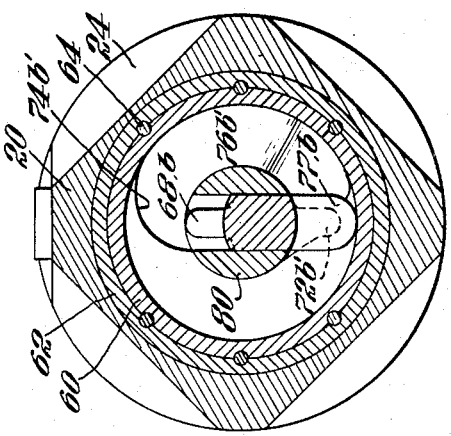
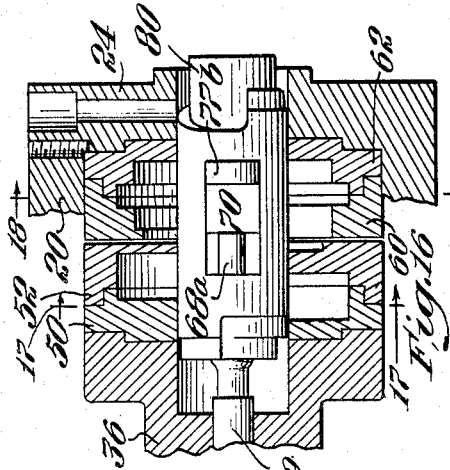
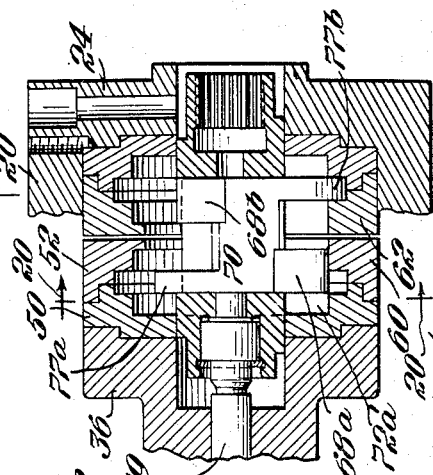
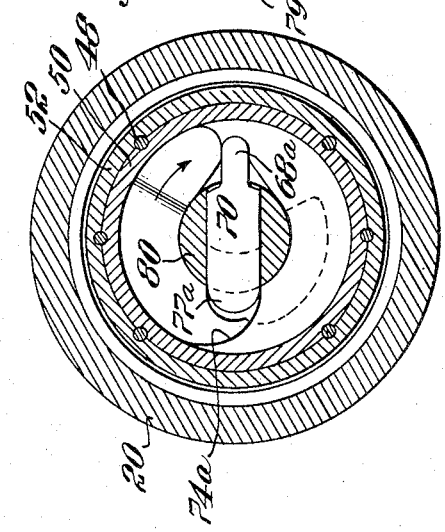
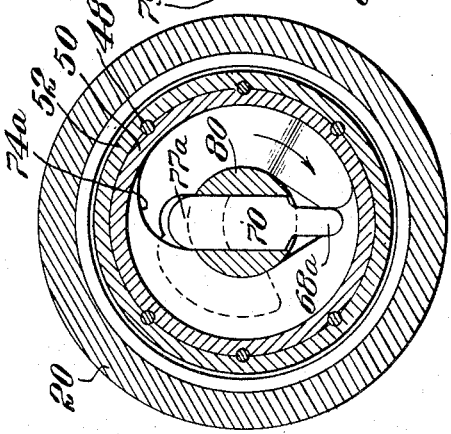
Inventor
Cutler D. Knowlton
by Roberts, Cushman & Grover
Att'ys.

Dec. 28, 1954  C. D. KNOWLTON  2,698,073
CLUTCH
Filed Oct. 5, 1951  7 Sheets-Sheet 6

Inventor
Cutler D. Knowlton
by Roberts, Cushman & Grover
att'ys.

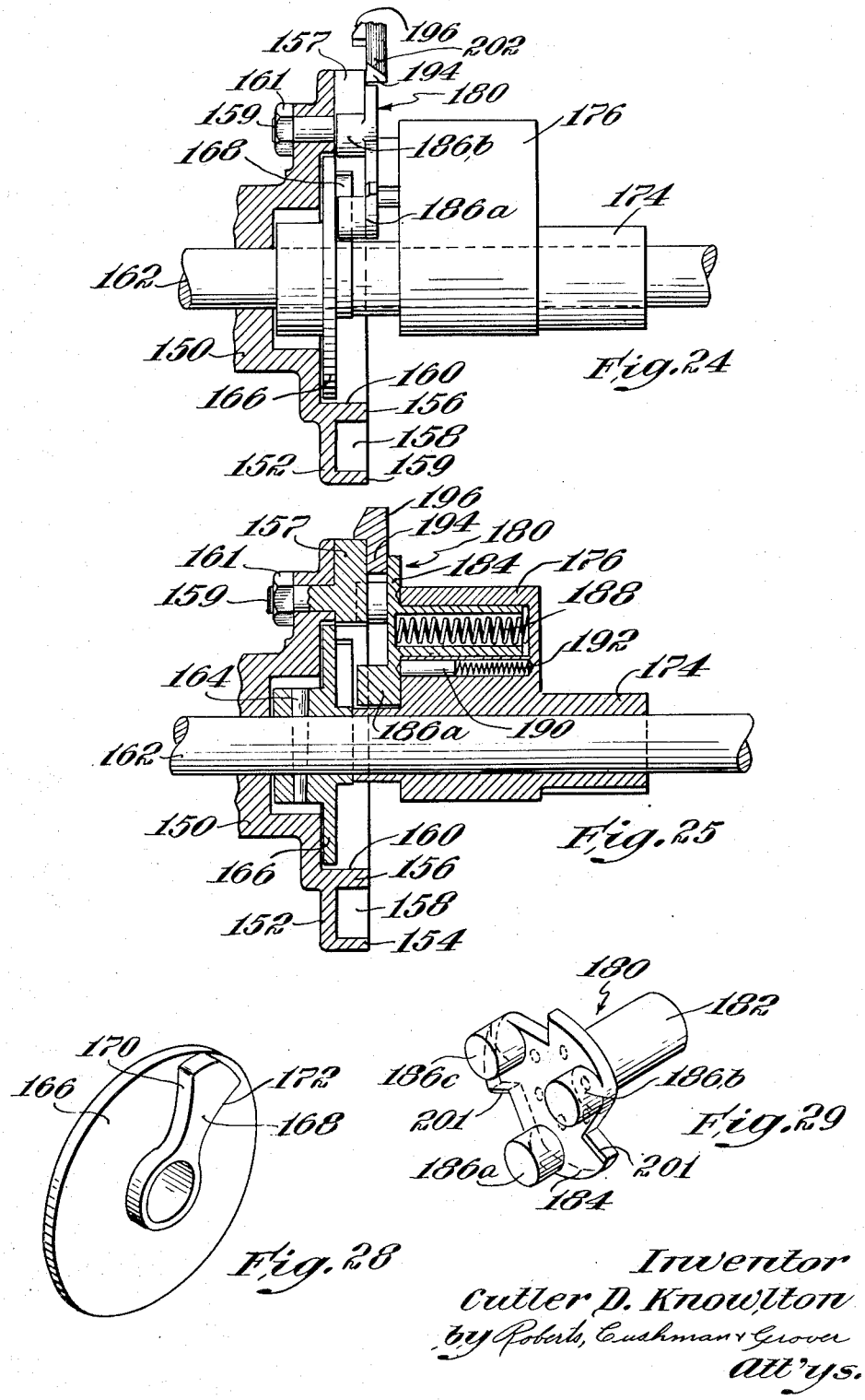

United States Patent Office 2,698,073
Patented Dec. 28, 1954

2,698,073

CLUTCH

Cutler D. Knowlton, Rockport, Mass.

Application October 5, 1951, Serial No. 249,869

19 Claims. (Cl. 192—30)

This invention relates to clutch mechanisms and more particularly to clutch mechanisms of the positive drive type wherein no slippage takes place after the driving and driven members are brought into engagement.

Objects of this invention are to provide a clutch which upon engagement gradually accelerates the driven member to the rotational speed of the driving member; which upon disengagement gradually decelerates the driven member; which positively controls the driven member during the entire accelerating and decelerating cycles; which operates without shock or vibration; which positively locks the driven and driving members in the engaged position; which positively locks the driven member when in a disengaged position; which is rugged in construction; which is economical to manufacture; which can be operated at high speeds; and which advances the art generally.

In a broad aspect the invention contemplates a clutch comprising two movable elements, one of which is a driving member, the other being a driven member journaled, preferably coaxially, to rotate with respect to a relatively stationary member, it being understood that the term "relatively stationary member" includes elements which rotate in the opposite direction or at a different speed than the driving member as well as being non-moving with respect thereto. Means are provided for bringing two distinct cam shaped portions of a coupling member, which is conjointly rotatable with the driven member, into engagement with cammed surfaces carried upon the driving and stationary members respectively. The cammed surfaces are shaped so as positively to move the coupling member through or along a constrained path with respect to the driven member thereby continuously changing the effective leverage so that throughout such movement the driven member is gradually accelerated to the rotational speed of the driving member.

In one specific aspect the coupling member is in the form of a cam engaging member having cam follower portions located respectively upon either end thereof for engaging concave cammed surfaces which rise in a generally radial direction. The cammed surfaces are formed in cam members such as plates or discs carried by or forming portions of the driving shaft and stationary member respectively which surfaces are engaged by the engaging member when it is moved axially of the shafts for example by further cam means.

Another feature is the provision of locking recesses in the members carrying the cammed surfaces which recesses are engaged by protuberances disposed opposite the respective cam following portions of the cam engaging member after the driven shaft has been accelerated to the speed of the driving shaft thereby to interlock positively such members in the engaged position of the clutch.

In another specific aspect the cam engaging member is mounted upon the driven member so as to be rotatable about an axis not coincident to the axis of rotation of the driven member. The engaging member is provided with cam-engaging portions such as a plurality of cylindrical pins which engage coordinated cammed surfaces carried by driving and stationary members respectively, the cammed surfaces being shaped to rotate the engaging member thus to change the effective leverage so that during such rotation the driven member is gradually accelerated to the rotational speed of the driving member.

These and other objects, aspects and features will be apparent from the following description of several specific embodiments of the invention referring to drawings wherein:

Fig. 7 is an exploded isometric view of the cam plates, the cam-engaging member and driven member;

Fig. 8 is an end view of one of the cam plates;

Fig. 9 is an end view of the mating cam plate;

Fig. 10 is a fragmentary sectional view showing the driving member revolved 90 degrees clockwise from the position shown in Fig. 6;

Fig. 11 is a sectional view on line 11—11 of Fig. 10;

Fig. 12 is a sectional view on line 12—12 of Fig. 10;

Fig. 13 is a fragmentary sectional view showing the driving member revolved approximately 90 degrees clockwise from the position shown in Fig. 10;

Fig. 14 is a sectional view on line 14—14 of Fig. 13;

Fig. 15 is a sectional view on line 15—15 of Fig. 13;

Fig. 16 is a fragmentary sectional view showing the driving member revolved approximately 90 degrees clockwise from the position shown in Fig. 13;

Fig. 17 is a sectional view on line 17—17 of Fig. 16;

Fig. 18 is a sectional view on line 18—18 of Fig. 16;

Fig. 19 is a fragmentary sectional view showing the driving member revolved approximately 90 degrees clockwise from the position shown in Fig. 16;

Fig. 20 is a sectional view on line 20—20 of Fig. 19;

Fig. 21 is a sectional view on line 21—21 of Fig. 19;

Fig. 24 is a side elevational view in partial section;

Fig. 25 is a sectional view on line 25—25 of Fig. 22;

Fig. 28 is an isomeric view of the driving member; and

Fig. 29 is an isometric view of the cam-engaging member.

Figure 6:
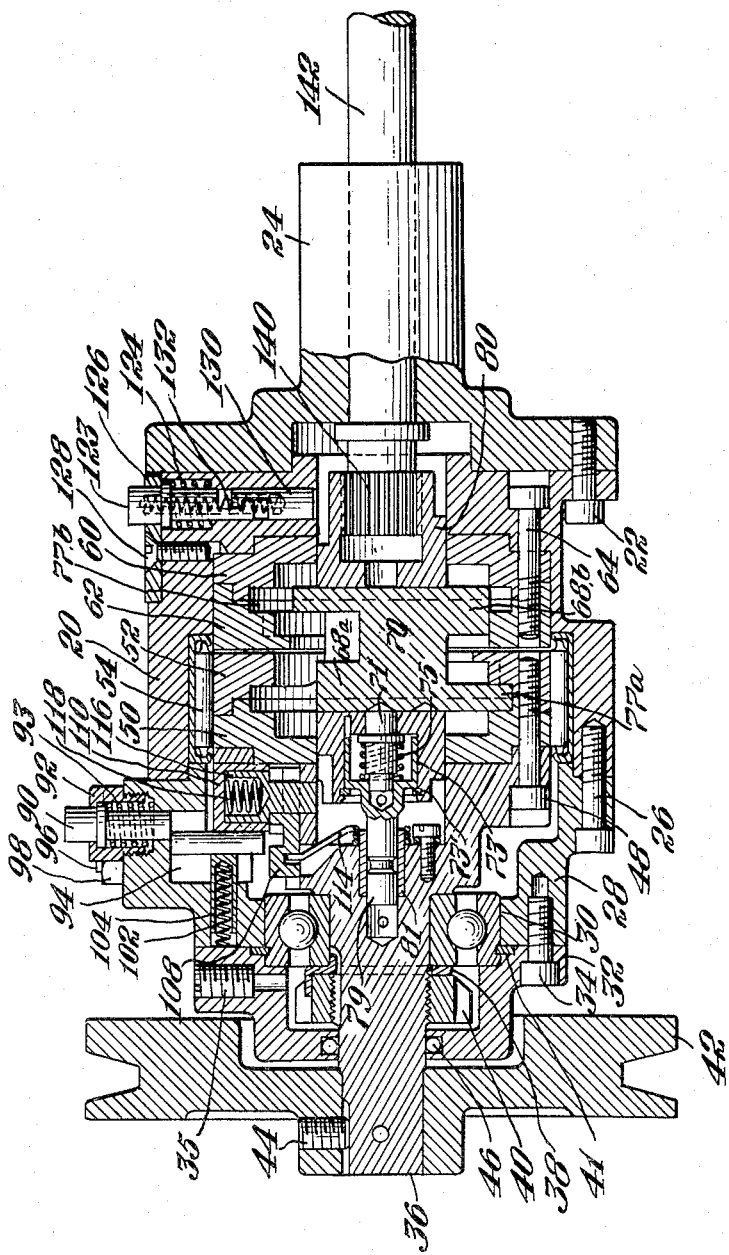
Fig. 6 is a sectional view on line 6—6 of Fig. 2.
Figure 22:
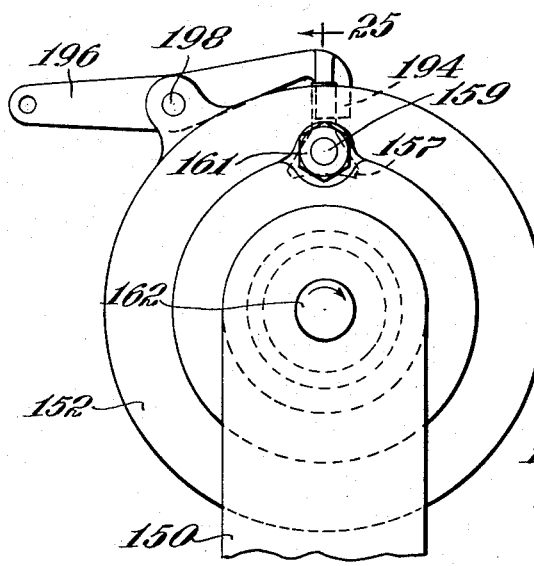
Fig. 22 is a front elevational view with parts broken away of a second embodiment of the invention.

As is best shown in Fig. 6, the first embodiment of the invention chosen for the purpose of illustration comprises a stationary member such as the housing 20 which is fastened upon one end thereof by means of several cap screws 22 to a flanged mounting 24 which is part of the machine (not shown) driven by the clutch. The opposite end of the housing 20 has fixed thereto by means of cap screws 26 a support 28 for a ball bearing 30. The end of the bearing support 28 is closed by a cover 32 which is attached to the support by means of cap screws 34. The cover 32 is provided with an oil filler plug 35.

A movable element such as the driving shaft 36 is provided with a shoulder which engages the inner race of the ball bearing 30. The bearing race is maintained against the shaft shoulder by means of a retaining ring 38 and an associated bearing nut 40 which engages threads cut upon the shaft 36. The outer race of the bearing is secured by a snap ring 41. The end of the shaft 36 extending through the cover 32 carries a sheave 42 which is secured thereto by a set screw 44. Leakage from the housing along the shaft is prevented by an oil seal 46 retained in a recess in the cover 32 so as to contact the periphery of the shaft. The opposite end of the shaft 36 is provided with a flange to which are attached by cap screws 48 a pair of mating cam plates 50 and 52 whose function will be described in detail hereinafter. The periphery of the cam plates 50 and 52 engage a needle bearing 54 carried by the housing 20 thereby to provide the second point of support for the driving element. A second pair of cam plates 60 and 62, which are similar to the above-mentioned cam plates 50 and 52, are fastened to the stationary housing 20 by means of cap screws 64.

The details of construction of the cam plates can best be seen in Figs. 7, 8 and 9. The plate 52 is provided with three cammed surfaces, the first of which is designated 66a and engages a cam following protuberance 68a upon a cam-engaging member 70. At one end of the cammed surface 66a is a locking recess 72a which retains or locks the protuberance 68a when it is engaged thereby as will be described in detail below. The second cammed surface 74a engages the cam following portion 77a of the slidable cam-engaging member 70. Although other types of concave cam surfaces can be used, I prefer that the cammed surface 74a, which is the load bearing surface, be a "cycloidal" curve which results in the optimum combination of pressure angles, normal pressure and sliding velocity without shock and a minimum accelerating force applied to the driven member. The acceleration for the cycloidal curve is a sine function starting at zero at the beginning of the action, increasing to a maximum and then decreasing to zero as the driven member reaches the rotational velocity of the driving member. Such acceleration with cycloidal displacement is obtained by generating cam surface 74a about a center line which is in the form of a cycloid wrapped around a base circle chosen so as to give a length of approximately 60 degrees. The formula for the cycloid curve is given by the expression:

$$\theta_1 = m(k\theta - \sin k\theta)$$

wherein:

$$m = \frac{\text{angular displacement of driven member in degrees}}{180}$$

$$k = \frac{180}{\text{angular displacement of driving member in degrees}}$$

$\theta_1$ = angular displacement of driven member in radians; and $\theta$ = angular displacement of the driving member in radians.

The cammed surface 66a is coordinate with the load bearing cammed surface 74a so that the cam following portion 77a is maintained in contact with the load bearing surface 74a and as the member 70 is rotated, as will be described hereinafter a transverse sliding motion is imparted to the member. The third cammed surface is in the form of a ramp 76a which rises from a maximum depth adjacent the cammed surface 74a to the level of the flat portion 78a of the cam plate. The central portion of the cam plate 52 is cut away to form an aperture to accommodate a driven element such as the shaft 80. The central aperture is further relieved as at 82a to facilitate assembly. The opposite side of the flat portion 78a is cut away declivously as at 84a to provide clearance for a second protuberance 68b upon the slidable member 70.

The mating cam plate 50 is generally similar to the cam plate 52 having corresponding flat portion 78a' and cam surfaces 66a', 74a' and 76a', the plates differing principally in that the plate 52 clearance aperture for the driven shaft 80 is circular and the locking recess 72a' extends only partially therethrough. As the cam surfaces in both plates are cut in the same hand as is shown in Figs. 8 and 9 when the plates 50 and 52 are brought face to face, the ramp of each plate lies opposite the flat portion of the other plate when the locking recesses are in alignment, as will be apparent from Fig. 7. The cam plates 60 and 62 are similar in construction to the cam plates 50 and 52 described in detail above, the corresponding portions thereof bearing similar indicia distinguished by the letter b rather than the letter a.

In the disengaged position of the clutch, illustrated in Fig. 6, the cam-engaging member 70 is positioned in the slot in the driven shaft 80 so that the end of the protuberance 68a is coincident with or slightly below the periphery of the shaft. In this position, the other protuberance 68b is extended to engage the locking recesses 72b, 72b' in the cam plates 60 and 62 so that the driven shaft 80 is locked to the stationary housing 20. The width of the cam-engaging portion 77a of the slidable member 70 is less than the clearance between the overlapping portions flat surfaces 78a and 78a' so that the cam plates 50 and 52 are free to rotate about such portion.

The slidable member 70 is maintained in the position shown in Fig. 6 against the accidental movement by means of a detent pin 71 which selectively engages two spaced recesses in the end face of the member 70. The pin 71 is enclosed in a cage 73, which is pressed into an axially disposed recess in the end of the driven shaft 80 wherein the cage is held by means of a snap ring 73'. The radial clearance between the pin 71 and the cage 73 is sufficient to accommodate a biasing spring 75, one end of which bears against a collar upon the pin and the other end of which is seated upon the bottom of the cage. One end of the pin is guided in an aperture extending from the bottom of the cage recess to the slot in the driven shaft 80 for the slidable member 70. The other end of the pin 71 is supported in a recess in the bottom of the cage 73. Formed integrally with and extending axially from the bottom of the cage 73 is a cylindrical portion 79 which slidingly engages a bushing 81 pressed into an axially disposed recess in the flange on the end of the shaft 36. The cylindrical portion 79 is provided with a circumferential groove which engages a detent (not shown) normally to locate the driven shaft 80 so that there is clearance between the cam following portions 77a and 77b and the flat portions of the cam plates.

Figure 1:
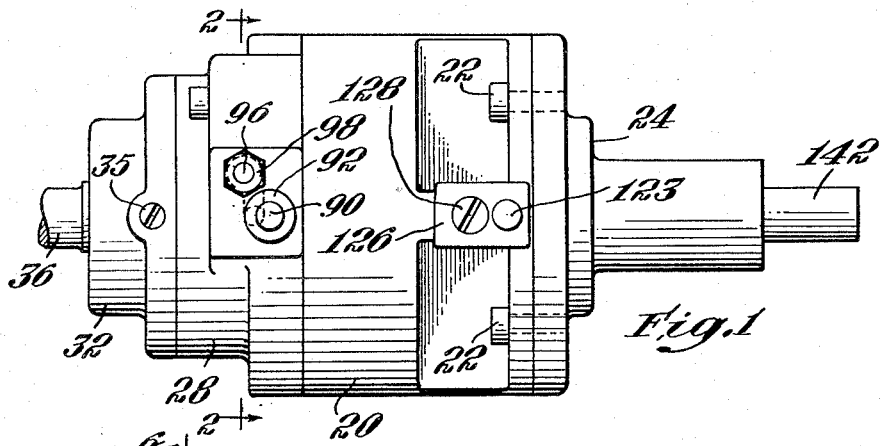
Fig. 1 is a plan view of a first embodiment of the invention.
Figure 2:
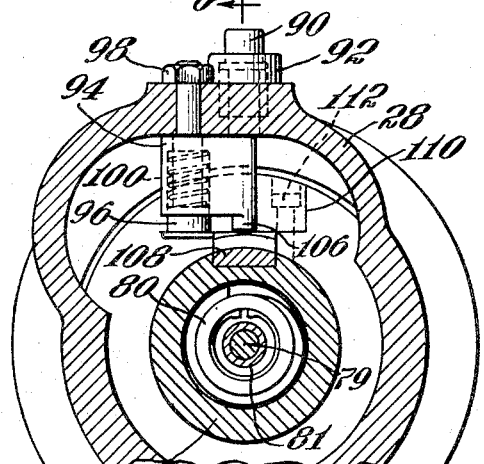
Fig. 2 is an enlarged partial sectional view on line 2—2 of Fig. 1 showing the start button in its normal position.
Figure 3:
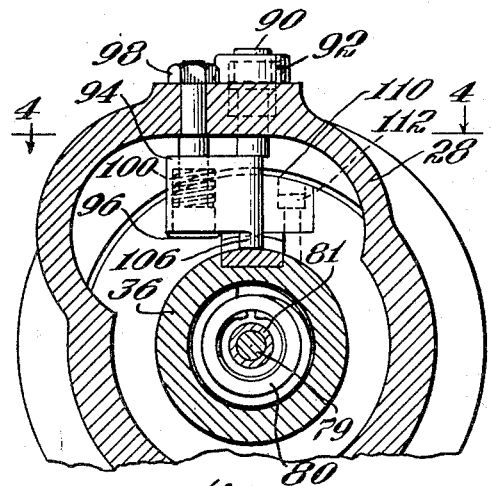
Fig. 3 is a fragmentary sectional view on line 2—2 of Fig. 1 showing the start button in the depressed position.
Figure 4:
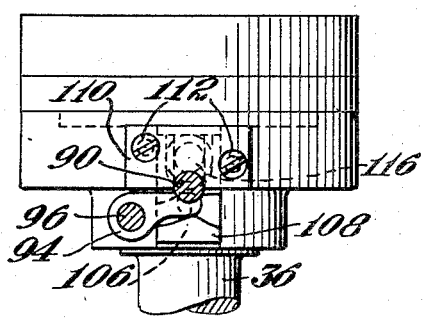
Fig. 4 is a partial sectional view on line 4—4 of Fig. 3.

The clutch is brought into engagement by axially moving the driven shaft 80 to bring the cam following portions into engagement with their respective cammed surfaces. To this end, a manually operated start button 90 is slidably disposed in an aperture in an insert 92 threaded into a boss on the top of the bearing support 28. The button 90 is biased upwardly by means of a spring 93 with the lower end thereof resting upon the top of a lever 94 whose shape can better be determined from Figs. 2 and 4. One end of the lever 94 is provided with an aperture for pivotally engaging the shank of a fulcrum pin 96 the upper end of which is to engage the corresponding threads in a threaded aperture in the boss in the bearing support 28. The end of the pin 96 is locked by means of a nut 98. The lower end of the aperture in the lever 94 is counterbored to accommodate a spring 100 which biases the lever upwardly along the pin 96 so that the top of the lever bears against the lower end of the start button 90. As is shown in Fig. 6, a spring 102 is compressed within a hollow plunger 104 slidably disposed within an aperture in the bearing support 28 so that the end of the plunger bears against the side of the lever thus biasing the lever in a position wherein the top thereof normally rests beneath the lower end of the start button 90. The lower end of the lever 94 is provided with projecting pin portion such as the cylindrical tip 106 (Fig. 2) which when the start button 90 is in its normal position is disengaged.

Figure 5:
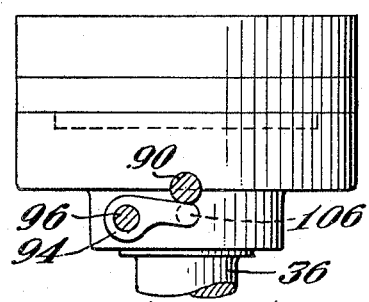
Fig. 5 is a fragmentary sectional view on line 4—4 of Fig. 3 with the driving shaft rotated 180 degrees.

When the start button 90 is manually depressed, the lever 94 is also forced downwardly so that tip 106 thereof is interposed in the path of a saddle 108 which is slidably held in a keyway in the flange of the driving shaft 36 by means of a cap 110 which is secured to the flange by means of two screws 112. As can best be seen in Fig. 4, the exposed end of the saddle 108, which extends beyond the end of the cap 110, is provided with a curved transverse slot, which is positioned so that when the lever 94 is depressed by start button 90, the tip 106 thereof will engage the slot. Because of the curvature of the slot in the saddle 108, the saddle is drawn back against the biasing force exerted by the free end of a spring 114 which engages a recess in the bottom of the saddle as is shown in Fig. 6. As the saddle 108 is thus drawn back, the opposite forked end thereof (also see Fig. 4) is withdrawn from beneath the head of a pin 116 which is reciprocatingly disposed in a recess in the bottom of the cap 110. The head of the pin 116 is hollow and has compressed therein a helical spring 118 which forces the shank of the pin 116 between the tines of the forked end of the saddle thus locking the saddle in its extended position. Further rotation of the driving shaft 36 moves the lever 94 out from beneath the button 90 so that the lever is free to be returned to its normal position by the spring 100 irrespective of the position of the button as is shown in Fig. 5. In this position the end of the pin 116 engages a barrel cammed surface 120 (Fig. 7) on the end of the driven shaft 80. The rate of rise of the barrel cammed surface 120 is made the same as that of the cammed surface 76a of the cam plate 52 so that as the driving shaft 36 rotates the driven shaft 80 and the slidable member 70 is gradually moved towards the rear or right of the clutch as viewed in Fig. 6.

The pin 116 is held down by the spring 118 until it is lifted by a ramp 122 (Fig. 7) cut in the periphery of the driven shaft 80 adjacent the barrel cammed surface 120 upon the return of the driven shaft towards the front (or left as viewed in Fig. 6) of the clutch, as will be described in detail hereinafter.

After approximately 90 degrees of clockwise rotation (as viewed from the front of the clutch) of the driving shaft 36, the various elements have assumed the position shown in Figs. 10, 11 and 12 in which the cam-engaging portion 77a of the slidable member 70 has descended to the bottom of the ramp 76a and the driven shaft 80 has axially moved to the right so that the locking protuberance 68b no longer engages the recess 72b in the cam plate 62 but is still in engagement with the mating recess 72b' in the cam plate 60.

Figs. 13, 14 and 15 show the relative positions of the various elements upon the clockwise rotation of the driving member 36 and the attached cam plates 50 and 52 to a position approximately 90 degrees from their respective positions illustrated in Figs. 10, 11 and 12. Such further rotation causes the cammed surfaces 74a and 74b' to engage the ends of the cam following portions 77a and 77b respectively. The cammed surfaces 74a and 74b' are shaped so that in this position the slidable member 70 is moved transversely in the slot in the driven shaft 80 sufficiently to withdraw the protuberance 68b from the recess 72b' in the cam plate 60. During such rotation of the driving shaft 36, the driven shaft 80 is also advanced approximately 5 degrees from its original stationary position thereby to start its acceleration.

During the next 90 degrees of rotation of the driving shaft 36 the cammed surfaces 74a and 74b' continue the movement of the slidable member 70 to the position shown in Figs. 16, 17 and 18, accelerating the driven shaft 80 to the same speed as that of the driving shaft 36 and causing the protuberance 68a to engage the locking recess 72a of the cam plate 52. Subsequent clockwise rotation of the driving shaft 36 conjointly rotates the driven shaft 80 so that the cam-engaging portion 77b rides up the ramp 76b' to the position shown in Fig. 21. The gradient of the ramp 76b' moves the driven shaft 80 forward towards the left to the position shown in Fig. 19. In this position of the driven shaft 80, the cam-engaging portion 77b rotates between the flat portions 78b and 78b' of the cam plates 60 and 62 respectively. The cam-engaging member 70 is restrained by the engagement of the detent pin 71 in the corresponding recess in the side of the slidable member 70 so that the tip of the protuberance 68b is maintained slightly below the periphery of the driven shaft 80. The above described return movement of the driven shaft causes the end of the pin 116 to be raised by the cammed surface 122 (Fig. 7) so that the spring 114 can return the saddle 108 to its normal or cocked position.

The clutch is disengaged by means of a stop button 123 (Fig. 6) which is reciprocally disposed in a recess in the top of the housing 20. The stop button 123 is biased upwardly in the normal position shown by means of a spring 124 interposed between a shoulder in the recess and a collar upon the button, the top of which also bears against the bottom of a cover plate 126 secured to the housing 20 by means of a flat-headed screw 128. The lower end of the shank of the stop button 123 has an undercut portion which interlocks with a similar undercut portion near the top of a cam-engaging pin 130. The undercut portions are maintained in engagement by means of a spring 132 whose ends are seated in respective aligned recesses in the bottom of the pin. When the stop button 123 is manually depressed, the lower end of the pin 130 is interposed in the path of the barrel cam 134 (Fig. 7) which is similar to the cam 120 in the other end of the driven shaft 80 so that the shaft is moved towards the front of the clutch thereby to decelerate the driven shaft in a manner analogous to the acceleration thereof described in detail heretofore. That is, the cam-engaging portion 77b of the sliding member 70 descends along the ramp 76b so that the end thereof is brought into contact with the cammed surface 74b, the end of the other portion 77a concomitantly being brought into contact with the cammed surface 74a'. The driven shaft 80 is gradually decelerated to a stop by the changing leverage exerted by the cam-engaging portions 77a and 77b of the sliding member 70, whereupon the cam-engaging portion 77a engages the ramp 76a' which returns the driven shaft to the position shown in Fig. 6.

The clutch is mounted, as described heretofore, by means of the cap screws 22, which engage threaded holes in the flange 24 of the machine (not shown) being driven so that a spline 140 cut in one end of the machine input shaft 142 engages a corresponding splined recess in the end of the driven shaft 80 of the clutch thereby to permit relative axial movement between the shafts. The driving shaft 36 of the clutch is connected to a power source, such as an electric motor either directly or by means of a conventional V-belt (neither of which is shown), which belt when used engages the groove in the periphery of the sheave 42.

In the disengaged position of the clutch the driven shaft 80 is locked to the housing 20 by the protuberance 68b upon the sliding member 70 as has been described in detail heretofore. Upon the manual operation of the start button 90 the driven shaft 80 is gradually accelerated to the rotational speed of the driving shaft 36 by the changing effective leverage exerted by the cam-engaging members 77a and 77b subsequent to which the driven and driving shafts are interlocked by the protuberance 68a thus effecting a positive mechanical drive which is free from slippage. The clutch is disengaged by manually operating the stop button 123 sequentially unlocking the driven and driving shafts, gradually decelerating the driven shaft to a stop and again locking the driven shaft to the housing.

The second embodiment of the invention to be described is in the form of a single revolution clutch which operates upon the same basic principles as the clutch described heretofore, but wherein the cam-engaging member rotates rather than slides transversely, as illustrated in Figs. 22 through 29. This second clutch comprises a stationary member such as the standard or support 150 which has formed integrally therewith a flange 152. The flange 152 is provided with two concentrically disposed ribs 154 and 156 (Fig. 27) which form a groove or trough 158. A sector of the inner rib 156 is omitted and the substantially triangular lower end of a stop 157 is centrically disposed in the omitted sector, the base portion of the stop being smaller than the omitted sector so that a clearance is left between the stop and either end of the rib 156. The sides 163 and 165 (Fig. 27) of the stop form the cammed surfaces of the stationary member. The stop 157 is fastened to the flange 152 of the support 150 by means of an integral threaded stud 159 (Fig. 24) which extends through an aperture in the flange to engage a nut 161 (Fig. 24).

The driving shaft 162, which may be connected, for example by means of a suitable sheave to a power source (neither of which is shown) is journaled in the support 150. Secured to the driving shaft 162, for example by means of a pin 164 (Fig. 25) is a disc 166 which has a radius slightly less than that of the inner cammed surface 160 of the rib 156 so that the disc is free to rotate therein as the driving shaft turns. Formed as an integral part of the disc 166 is a radially extending boss 168 (Fig. 28) whose concave side portions form the cammed surface 170 and 172 of the driving member.

The driven member consists of a shaft 174 (Fig. 24) which is arranged concentrically with the driving shaft 162 and is carried thereby, the driven shaft having formed integrally therewith a radially extending boss 176. Journaled in an axially disposed recess near the outer end of the boss 176 is a cam-engaging member 180. As can best be seen in Fig. 29 the cam-engaging member has a shaft portion 182 at one end of which is carried a notched plate portion 184 wherefrom axially extend three equally spaced cylindrical cam-engaging portions designated 186a, 186b and 186c respectively. The shaft portion 182 is hollow to accommodate a spring 188 (Fig. 25) which tends to force the cam-engaging member 180 away from the front face of the boss 176 towards the flange 152 of the support 150. As can best be seen in Fig. 29 behind each of the cylindrical cam-engaging portions 186a, 186b and 186c in the inner face of the plate portion 184 of the member 180 are located six recesses for selectively engaging the tip of a detent pin 190 (Fig. 25) which is slidably disposed in an axial recess in the boss 176. A spring 192 is inserted behind the pin 190 to bias the pin so that the cam-engaging member 180 is restrained in one of six definitely fixed positions, as will be described in detail hereinafter.

Figure 26:
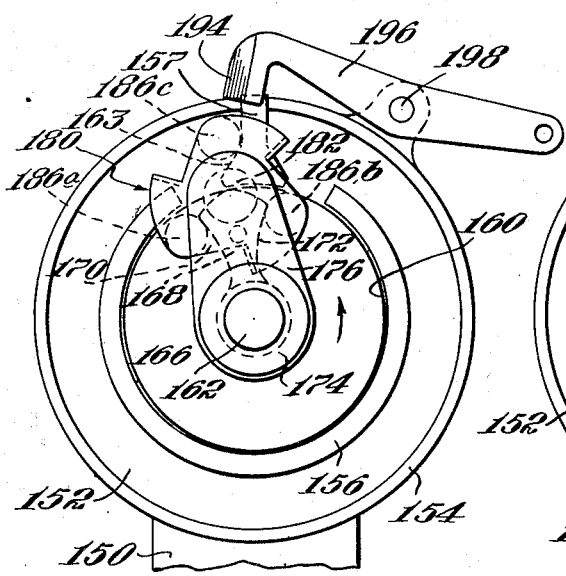
Fig. 26 is a rear elevational view of the embodiment shown in Fig. 22 in the engaged position.
Figure 27:
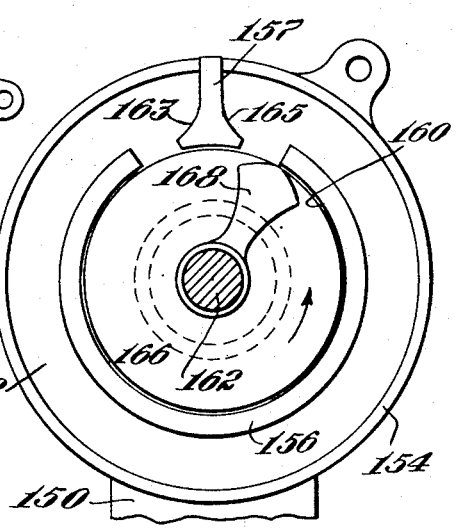
Fig. 27 is a rear elevational view with parts removed.

In a disengaged position of the clutch shown in Fig. 25 a finger 194 carried upon one end of a tripping lever 196 which is pivotally mounted upon the support 150 as at 198 is interposed between the plate portion 184 of the cam-engaging member 180 and the face of the stop 157 to hold the member against the force exerted by the spring 188 so that cam-engaging portion 186a is not in the path of the cammed surface 170 of the driving boss 168 as it is rotated by the driving shaft 162. The clutch is brought into engagement by manually lifting the finger 194 so that the cam-engaging member 180 is axially moved forward by the force exerted by the spring 188 to the position shown in Fig. 24. This axial movement of the member 180 brings the cam-engaging portion 186a in the bottommost position into the path of the driving boss 168 so that cam-engaging portion 186a contacts the cammed surface 170 of the driving boss 168 shown in Fig. 23. Further rotation of the driving shaft 162 causes the cam-engaging member 180 to rotate about the axis of its shaft portion 182. The cam-engaging portion 186c bears against the stationary cammed surface 163 to move angularly the axis of the shaft portion 182 about the axis of the driving shaft 162 with a gradual acceleration due to a change in the effective leverage until the position shown in Fig. 26 is reached wherein the boss 168 is interposed between the two cam-engaging portions 186a and 186b. The driving boss 168 is locked in this position upon further rotation of the driving shaft 162 by the inner surface 160 of the rib 156 which prevents rotation of the cam-engaging member so that the driving and driven shafts rotate together.

Figure 23:
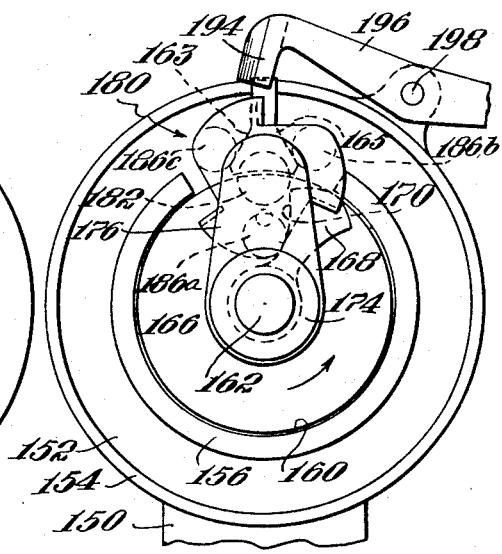
Fig. 23 is a rear elevational view of the embodiment shown in Fig. 22.

Upon the completion of a single revolution, the cam-engaging portion 186c contacts the cammed surface 165 of the stop 157 so that a decelerating action, which is the reverse of the above descibed accelerating action takes place to bring the driven shaft 174 to a stop with the cam-engaging member 180 rotated 120 degrees clockwise from the position illustrated in Fig. 23 with the boss 168 upon the opposite side of the bottom-most cam-engaging portion from illustrated position so that the driving shaft 162 is free to continue its rotation.

If the trip lever 196 is maintained in its retracted position upon the completion of the second revolution of the driving shaft 162, the boss 168 again picks up the bottom-most cam-engaging member to repeat the above described cycle of acceleration and deceleration of the driven shaft 174. Upon the release of the trip lever 196, one of the beveled edges 201 (Fig. 29) upon the respective notches of the plate portion 184 of the cam-engaging member 180 contacts the corresponding bevel 202 (Fig. 24) on the end of the finger 194 upon the completion of the deceleration portion of the cycle to force the cam-engaging member back against the force exerted by the spring 188 so that cam-engaging portions are no longer in the path of the boss 168 thus disengaging the clutch.

It should be understood that the present disclosure is for the purpose of illustration only and that this invention includes all modifications and equivalents which fall within the scope of the appended claims.

I claim:

1. A clutch comprising a relatively stationary member and two movable elements journaled to rotate with respect to the stationary member, one of said movable elements being a driving member, the other being a driven member, said driving and stationary members each having respective cammed surfaces, a coupling member carried by said driven member so as to rotate conjointly therewith, said coupling member being movable along a constrained path with respect to said driven member and having cammed surfaces adapted to engage the cammed surfaces of the driving member and other cammed surfaces adapted simultaneously to engage the cammed surfaces of the stationary member when moved along said constrained path, and means for bringing the cammed surfaces of the coupling member into contact with the cammed surfaces of both the driving and stationary members, said cammed surfaces being shaped so as to cooperate in positively moving said coupling member along said constrained path to effect a transition in the effective leverage to accelerate the driven member from a fixed relationship with respect to the stationary member to a fixed relationship with respect to the driving member during the engaging period of the clutch.

2. A clutch comprising a relatively stationary member and two movable elements journaled to rotate with respect to the stationatry member, one of said movable elements being a driving member, the other being a driven member, said driving and stationary members each having respective cammed surfaces, a coupling member carried by said driven member so as to rotate conjointly therewith, said coupling member being movable along a constrained path with respect to said driven member and having cammed surfaces adapted to engage the cammed surfaces of the driving member and other cammed surfaces adapted simultaneously to engage the cammed surfaces of the stationary member when moved along said constrained path, and means for shifting the coupling member axially with respect to the axis of rotation of the driven member to bring the cammed surfaces of the coupling member into contact with the cammed surfaces of both the driving and stationary members, said cammed surfaces being shaped as to cooperate in positively moving said coupling member along said constrained path to effect a transition in the effective leverage to accelerate the driven member from a fixed relationship with respect to the stationary member to a fixed relationship with respect to the driving member during the engaging period of the clutch.

3. A clutch comprising a relatively stationary member and two movable elements journaled to rotate with respect to the stationary member, one of said movable elements being a driving member, the other being a driven member, said driving and stationary members each having respective cammed surfaces, a coupling member carried by said driven member so as to rotate conjointly therewith, said coupling member being movable along a constrained path with respect to said driven member and having cammed surfaces adapted to engage the cammed surfaces of the driving member and other cammed surfaces adapted simultaneously to engage the cammed surfaces of the stationary member when moved along said constrained path, and means for bringing the cammed surfaces of the coupling member into contact with the cammed surfaces of both the driving and stationary members, the load bearing cammed surfaces being cycloidally shaped so as to cooperate in positively moving said coupling member along said constrained path to effect a transition in the effective leverage to accelerate the driven member from a fixed relationship with respect to the stationary member to a fixed relationship with respect to the driving member during the engaging period of the clutch.

4. A clutch comprising a relatively stationary member and two movable elements journaled to rotate with respect to the stationary member, one of said movable elements being a driving member, the other being a driven member, said driving and stationary members each having a respective pair of coordinated cammed surfaces, a cam engaging member carried by said driven member so as to rotate conjointly therewith, said engaging member being movable along a constratined path with respect to said driven member and effective to lock said driven member to the stationary member when moving along said constrained path to the disengaged position of the clutch, and means for shifting the engaging member into contact with the cammed surfaces of both the driving and stationary members thereby to unlock the driven and stationary members, said cammed surfaces being shoped so as to cooperate in positively moving the engaging member in said constrained path to effect a transition in the effective leverage to accelerate the driven member from its fixed relationship with respect to the stationary member to a fixed relationship with respect to the driving member during the engaging period of the clutch whereupon the engaging member locks the driven member to the driving member.

5. A clutch comprising a relatively stationary member and two movable elements journaled to rotate with respect to the stationary member, one of said movable elements being a driving member, the other being a driven member, said driving and stationary members each having a respective pair of coordinated cammed surfaces, a cam engaging member carried by said driven member so as to rotate conjointly therewith, and means for axially moving the engaging member to bring it into contact with the cammed surfaces of both the driving and stationary members, said cammed surfaces being shaped to slide the engaging member along a constrained path substantially normal to the axis of rotation of the driven member thus to change the effective leverage so that during such movement the driven member is gradually accelerated to the rotational speed of the driving member.

6. A clutch comprising a relatively stationary member and two movable elements journaled to rotate with respect to the stationary member, one of said movable elements being a driving member, the other being a driven member, said driving and stationary members each having a respective pair of cammed surfaces, the load bearing cammed surfaces being concave, a cam engaging member carried by said driven member so as to rotate conjointly therewith, and means for axially moving the engaging member to bring it into contact with the cammed surfaces of both the driving and stationary members, said cammed surfaces being shaped to slide the engaging member along a constrained path substantially normal to the axis of rotation of the driven member thus to change the effective leverage so that during such movement the driven member is gradually accelerated to the rotational speed of the driving member.

7. A clutch comprising a relatively stationary member and two movable elements journaled to rotate coaxially with respect to the stationary member, one of said movable elements being a driving member, the other being a driven member having a radially disposed aperture therein, the driving and stationary members each having a respective concave cammed surface, said cammed surfaces being in spaced relationship along the axis of rotation, a cam-engaging member carried in the aperture of said driven member so as to rotate conjointly therewith, said engaging member having two cam following portions located respectively upon opposite sides of said driven member so as to engage the adjacent cammed surfaces of said driving and stationary members, and means for axially moving the engaging member to bring the cam following portions into contact with the cammed surfaces of both the driving and stationary members, said cammed surfaces being shaped to slide the engaging member along a constrained path substantially normal to the driven member resulting in a transition in the effective leverage to accelerate the driven member from its fixed relationship with respect to the stationary member to a fixed relationship with respect to the driving member during the engaging period of the clutch.

8. A clutch comprising a relatively stationary member and two movable elements journaled to rotate coaxially with respect to the stationary member, one of said movable elements being a driving member, the other being a driven member having a radially disposed aperture therein, said driving and stationary member each having a respective pair of coordinated cammed surfaces, said pairs of cammed surfaces being in spaced relationship along the axis of rotation, a cam-engaging member carried in the aperture of said driven member so as to rotate conjointly therewith, said engaging member having two cam following portions located respectively upon opposite sides of said driven member so as to engage one cammed surface of each pair and two protuberances disposed opposite the cam following portions for engaging respectively the other cammed surface of each pair, and means for axially moving the engaging member to bring the cam following portions and protuberances into contact with the cammed surfaces of both the driving and stationary members, said opposed cammed surfaces of each pair being shaped to slide the engaging member along a constrained path substantially normal to the driven member resulting in a transition in the effective leverage to accelerate the driven member from its fixed relationship with respect to the stationary member to a fixed relationship with respect to the driving member during the engaging period of the clutch.

9. A clutch comprising a relatively stationary housing and two coaxially disposed elements journaled in said housing, one of said elements being a driving shaft the other being a driven shaft having a radially disposed slotted aperture therethrough, a cam member having a concave cammed surface which rises in a generally radial direction carried by said driving shaft, a second cam member having a similar cammed surface secured to the housing so that the cammed surfaces are in a spaced relationship along the axis of rotation of the shafts, a cam-engaging member carried in the aperture of said driven shaft so as to rotate conjointly therewith, said engaging member having two cam following portions located respectively upon opposite sides of the driven shaft so as to engage the adjacent cammed surfaces of the cam members, and means for axially moving the engaging member to bring the cam following portions into contact with the cammed surfaces of both the driving and stationary members, said cammed surfaces being shaped to slide the engaging member along a constrained path substantially normal to the axis of the driven shaft resulting in a transition in the effective leverage to accelerate the driven member from its fixed relationship with respect to the stationary member to a fixed relationship with respect to the driving member during the engaging period of the clutch.

10. A clutch comprising a relatively stationary housing and two coaxially disposed elements journaled in said housing, one of said elements being a driving shaft the other being a driven shaft having a radially disposed slotted aperture therethrough, a cam member carried by said driving shaft, and having a pair of opposed cammed surfaces which rise in a generally radial direction, a second cam member having a similar pair of cammed surfaces secured to the housing so that the pairs of cammed surfaces are in a spaced relationship along the axis of rotation of the shafts, a cam-engaging member carried in the aperture of said driven shaft so as to rotate conjointly therewith, said engaging member having two cam following portions located respectively upon opposite sides of the driven shaft so as to engage one cammed surface of each pair and two protuberances disposed opposite the cam following portions for engaging respectively the other cammed surface of each pair, and means for axially moving the engaging member to bring the cam following portions and protuberances into contact with the cammed surfaces of both the driving and stationary members, said opposed cammed surfaces of each pair being shaped to slide the engaging member along a constrained path substantially normal to the axis of the driven shaft resulting in a transition in the effective leverage to accelerate the driven member from its fixed relationship with respect to the stationary member to a fixed relationship with respect to the driving member during the engaging period of the clutch.

11. A clutch comprising a relatively stationary housing and two axially disposed elements journaled in said housing, one of said elements being a driving shaft the other being a driven shaft having a radially disposed slotted aperture therethrough, a cam member having a concave cammed surface which rises in a generally radial direction carried by said driving shaft and a locking recess, a second cam member having a similar cammed surface and locking recess secured to the housing so that the cammed surfaces are in a spaced relationship along the axis of rotation of the shafts, a cam-engaging member carried by said driven shaft so as to rotate conjointly therewith, said engaging member having two cam following portions located respectively upon opposite sides of the driven shaft so as to engage their correlated cammed surfaces and two protuberances disposed opposite the respective cam following portions, one of said protuberances engaging the recess in the cam member secured to the housing to lock the driven shaft in the disengaged position of the clutch, and means for axially moving the engaging member to bring the cam following portions into contact with the cam surfaces of both the driving and stationary members whereupon the protuberances is retracted from the recess, said cammed surfaces being shaped to slide the engaging member along a constrained path substantially normal to the axis of the driven shaft resulting in a transition in the effective leverage to accelerate the driven member from its fixed relationship with respect to the stationary member to a fixed relationship with respect to the driving member during the engaging period of the clutch whereupon the other protuberance engages the recess in the cam member carried by the driving shaft thereby to interlock positively the driving and driven shafts in the engaged position of the clutch.

12. A clutch comprising a relatively stationary housing and two coaxially disposed elements journaled in said housing, one of said elements being a driving shaft the other being a driven shaft having a radially disposed slotted aperture therethrough, a cam member carried by said driving shaft, said cam member having a pair of opposed cammed surfaces which rise in a generally radial direction and a locking recess, a second cam member having a similar pair of cammed surfaces and a locking recess secured to the housing so that the pairs of cammed surfaces are in a spaced relationship along the axis of rotation of the shafts, a cam-engaging member carried by said driven shaft so as to rotate conjointly therewith, said engaging member having two cam following portions located respectively upon opposite sides of the driven shaft so as to engage one cammed surface of each pair and two protuberances disposed opposite the cam following portions for engaging respectively the other cammed surface of each pair, one of said protuberances engaging the recess in the cam member secured to the housing to lock the driven shaft in the disengaged position of the clutch, and means for axially moving the engaging member to bring the cam following portions and protuberances into contact with the cammed surfaces of both the driving and stationary members whereupon the protuberance is retracted from the recess, said opposed cammed surfaces of each pair being shaped to slide the engaging member along a constrained path substantially normal to the axis of the driven shaft resulting in a transition in the effective leverage to accelerate the driven member from its fixed relationship with respect to the stationary member to a fixed relationship with respect to the driving member during the engaging period of the clutch whereupon the other protuberance engages the recess in the cam member carried by the driving shaft thereby to interlock positively the driving and driven shafts in the engaged position of the clutch.

13. A clutch comprising a relatively stationary housing and two coaxially disposed elements journaled in said housing, one of said elements being a driving shaft the other being a driven shaft, a cam member having a concave cammed surface carried by said driving shaft, a second cam member having a similar cammed surface secured to the housing so that the cammed surfaces are in a spaced relationship along the axis of rotation of the shafts, a cam-engaging member carried by said driven shaft so as to rotate conjointly therewith, said engaging member having two cam following portions for engaging the adjacent cammed surfaces of the cam member, and cam means for axially moving the engaging member to bring the cam following portions of the engaging member into contact with the cammed surfaces of both the driving and stationary members, said cammed surfaces being shaped to slide the engaging member along a constrained path substantially normal to the axis of the driven shaft resulting in a transition in the effective leverage to accelerate the driven member from its fixed relationship with respect to the stationary member to a fixed relationship with respect to the driving member during the engaging period of the clutch.

14. A clutch comprising a relatively stationary housing and two coaxially disposed elements journaled in said housing, one of said elements being a driving shaft the other being a driven shaft, a cam member carried by the driving shaft, said cam member having a cammed surface rising in a generally radial direction and a cammed surface rising in an axial direction disposed adjacent the concave cammed surface, a second cam member having two similar cammed surfaces secured to the housing so that the cammed surfaces are in a spaced relationship along the axis of rotation of the shafts, a cam-engaging member carried by said driven shaft so as to rotate conjointly therewith, said engaging member having two cam following portions located respectively upon opposite sides of the driven shaft so as to engage the adjacent cammed surfaces of the cam member, the axial cam surfaces being effective to engage the cam following portions to move the engaging element axially to bring the cam following portions into contact with the radial cammed surfaces of both the driving and stationary members, said radial cammed surfaces being shaped to slide the engaging member along a constrained path substantially normal to the axis of the driven shaft resulting in a transition in the effective leverage to accelerate the driven member from its fixed relationship with respect to the stationary member to a fixed relationship with respect to the driving member during the engaging period of the clutch.

15. A clutch comprising a relatively stationary housing and two coaxially disposed elements journaled in said housing, one of said elements being a driving shaft the other being a driven shaft; a cam member carried by said driving shaft and having a cammed surface rising in a generally radial direction, a cammed surface rising in an axial direction disposed adjacent the cammed surface and a locking recess located at one end of said cammed surfaces; a second cam member having two similar cammed surfaces and a locking recess secured to the housing so that the cammed surfaces are in a spaced relationship along the axis of rotation of the shafts; a cam-engaging member carried by said driven shaft so as to rotate conjointly therewith, said engaging member having two cam following portions located respectively upon opposite sides of the driven shaft so as to engage their correlated cammed surfaces and a respective locking protuberance disposed opposite each of the cam following portions, one of said protuberances engaging the recess in the cam member secured to the housing to lock the driven shaft in the disengaged position of the clutch; and means for engaging one of the axial cammed surfaces to axially move the driven shaft to bring the cam following portions into contact with the radial cammed surfaces, the radial cammed surfaces being shaped to slide the engaging member along a constrained path substantially normal to the axis of the driven shaft withdrawing the protuberance from the recess and causing a transition in the effective leverage to accelerate the driven member from its fixed relationship with respect to the stationary member to a fixed relationship with respect to the driving member during the engaging period of the clutch whereupon the other protuberance engages the recess in the cam member carried by the driving shaft thereby to interlock positively the driving and driven members in the engaged position of the clutch.

16. A clutch comprising a relatively stationary housing and two coaxially disposed elements journaled in said housing, one of said elements being a driving shaft the other being a driven shaft; a cam member carried by said driving shaft, said member having a pair of opposed cammed surfaces which rise in a generally radial direction, a cammed surface which rises in an axial direction disposed adjacent the pair of cammed surfaces and a locking recess located adjacent the end of one of said cammed surfaces; a second cam member having two similar cammed surfaces and a locking recess secured to the housing so that the cammed surfaces are in a spaced relationship along the axis of rotation of the shafts; a cam-engaging member carried by said driven shaft so as to rotate conjointly therewith, said engaging member having two cam following portions located respectively upon opposite sides of the driven shaft so as to engage one cammed surface of each pair and two protuberances disposed opposite the cam following portions for engaging respectively the other cammed surface of each pair, one of said protuberances engaging the recess in the cam member secured to the housing to lock the driven shaft in the disengaged position of the clutch; and means for engaging one of the axial cammed surfaces to axially move the driven shaft withdrawing the protuberance from the recess and causing the cam following portions and protuberances to come into contact with the radial cammed surfaces, the radial cammed surfaces being shaped to slide the engaging member along a constrained path substantially normal to the axis of the driven shaft resulting in a transition in the effective leverage to accelerate the driven member from its fixed relationship with respect to the stationary member to a fixed relationship with respect to the driving member during the engaging period of the clutch whereupon the other protuberance engages the recess in the cam member carried by the driving shaft thereby to interlock positively the driving and driven members in the engaged position of the clutch.

17. A clutch comprising a relatively stationary member and two movable members journaled to rotate with respect to the stationary member, said driving and stationary members having cammed surfaces, a cam-engaging member carried by said driven member so as to rotate conjointly therewith, and means for moving the engaging member to bring it into contact with the cammed surfaces of both the driving and stationary members, said cammed surfaces being shaped to rotate the engaging member with respect to the driven member resulting in a transition in the effective leverage to accelerate the driven member from its fixed relationship with respect to the stationary member to a fixed relationship with respect to the driving member during the engaging period of the clutch.

18. A clutch comprising a relatively stationary member and two movable members journaled to rotate with respect to the stationary member, said driving and stationary members having cammed surfaces, a cam-engaging member carried by said driven member so as to rotate conjointly therewith, said cam-engaging member having a plurality of pins, and means for moving the pins into contact with the cammed surfaces of both the driving and stationary members, said cammed surfaces being shaped to rotate the engaging member with respect to the driven member resulting in a transition in the effective leverage to accelerate the driven member from its fixed relationship with respect to the stationary member to a fixed relationship with respect to the driving member during the engaging period of the clutch.

19. A clutch comprising a relatively stationary member and two movable members journaled to rotate with respect to the stationary member, said driving and stationary members having coordinated cammed surfaces the load carrying one of which is concave, a cam-engaging member carried by said driven member so as to rotate conjointly therewith, said cam engaging member having a plurality of cylindrical pins and means for axially moving said pins into contact with the cammed surfaces of both the driving and stationary members, said cammed surfaces being shaped to rotate the engaging member about an axis parallel to the axis of rotation of the driven member resulting in a transition in the effective leverage to accelerate the driven member from its fixed relationship with respect to the stationary member to a fixed relationship with respect to the driving member during the engaging period of the clutch.

References Cited in the file of this patent

UNITED STATES PATENTS

| Number | Name | Date |
|---|---|---|
| 2,240,280 | Altorfer | Apr. 29, 1941 |